(12) United States Patent
Iwata (10) Patent No.: US 6,471,008 B1
(45) Date of Patent: Oct. 29, 2002

(54) BALANCE SHAFT HOUSING

(75) Inventor: Kazuyuki Iwata, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 78 days.

(21) Appl. No.: 09/651,336

(22) Filed: Aug. 31, 2000

(30) Foreign Application Priority Data

Sep. 3, 1999 (JP) ............................................ 11-250120

(51) Int. Cl.$^7$ ............................ F16N 31/00; F02B 75/06
(52) U.S. Cl. ........................ 184/106; 74/605; 123/192.2
(58) Field of Search ............................... 74/605, 606 R, 74/607; 184/106, 1.5, 11.1–11.5, 6.13, 6.2; 123/192.2

(56) References Cited

U.S. PATENT DOCUMENTS

| | | | | |
|---|---|---|---|---|
| 4,703,724 A | * | 11/1987 | Candea et al. | 123/192.2 |
| 4,703,725 A | * | 11/1987 | Weertman | 123/192.2 |
| 5,467,843 A | | 11/1995 | Esch et al. | 184/6.5 |
| 5,535,643 A | | 7/1996 | Garza | 74/603 |
| 5,791,309 A | * | 8/1998 | Yamazaki et al. | 123/192.2 |

FOREIGN PATENT DOCUMENTS

| | | |
|---|---|---|
| DE | 42 04 522 C1 | 4/1993 |
| EP | 0 789 166 A1 | 8/1997 |
| EP | 0 979 957 A2 | 2/2000 |
| JP | 05-39233 | 10/1993 |

* cited by examiner

Primary Examiner—David A. Bucci
Assistant Examiner—Timothy McAnulty
(74) Attorney, Agent, or Firm—Armstrong, Westerman & Hattori, LLP (57) ABSTRACT

There is provided a balance shaft housing (an upper housing 14U, a lower housing 14L) disposed in an oil pan (7) for accommodating balance shafts (13L, 13R) provided with counterweights (19) for canceling out a vibromotive force caused by pistons, characterized in that the housing comprises housings which are divided along a plane which is parallel with the balance shafts, and gaps (37) are formed between edge surfaces of respective side walls of the divided housings which are brought into contact with the plane for discharging lubricating oil from the housing, and that eaves-like projecting portions (38) are integrally formed on the upper housing (14U) of the divided housings for covering the surfaces confronting the gaps, whereby the eaves-like projecting portions help not only prevent lubricating oil from flowing into the housing but also enhance the rigidity of the housing.

13 Claims, 8 Drawing Sheets

BALANCE SHAFT HOUSING

BACKGROUND OF THE INVENTION

1. Field of the Invention

The present invention relates to a balance shaft housing, and more particularly to a housing for accommodating balance shafts provided with counterweights for canceling out a vibromotive force caused by pistons.

2. Description of the Related Art

For example, JP-B-5-39233U discloses a balancing device in which balance shafts provided with counterweights for canceling out a secondary vibromotive force generated by pistons of an engine are disposed below a crankshaft within an oil pan and in which the rotation of the crankshaft is transmitted to the balance shafts via a chain/sprocket mechanism or a gear mechanism.

Since the balance shafts of the balancing device are provided below the surface of lubricating oil in the oil pan, in order to prevent the occurrence of inconveniences caused by lubricating oil stirred by the balance shafts, the balance shafts are fully covered by the housing. In addition, when a great amount of lubricating oil stay within the housing, since it constitutes resistance to the rotation of the balance shafts, the lubricating oil within the housing must be discharged without any delay, and the aforesaid patent publication discloses the balance shaft housing constructed such that the lubricating oil within the housing is discharged by the rotating balance shafts.

According to the construction disclosed in the above patent publication, however, the discharge ports for lubricating oil are made open upwardly, and therefore, this construction facilitates the entering into the housing of lubricating oil dropping from the cylinder block. Thus, the efficiency at which lubricating oil is discharged from the interior of the housing cannot be improved. Additionally, in the event that there are provided openings, additional means is needed for securing the rigidity of the housing, and this tends to complicate the configuration of the housing itself.

SUMMARY OF THE INVENTION

The invention was contrived with a view to solving the drawbacks inherent in the related art, and a primary object thereof is to provide a balance shaft housing which is constructed so as to prevent the intrusion into the housing of lubricating oil dropping from the cylinder block side while maintaining the rigidity as high as possible.

With a view to attaining the object, according to a first aspect of the invention, there is provided a balance shaft housing (an upper housing 14U, a lower housing 14L) disposed in an oil pan (7) For accommodating balance shafts (13L, 13R) provided with counterweights (19) for canceling out a vibromotive force caused by pistons, characterized in that the housing comprises housings which are divided along a plane which is parallel with the balance shafts, and gaps (37) are formed between edge surfaces of respective side walls of the divided housings which are brought into contact with the plane for discharging lubricating oil from the housing, and that eaves-like projecting portions (38) are integrally formed on the upper housing (14U) of the divided housings for covering the surfaces confronting the gaps. According to this construction, the eaves-like projecting portions help not only prevent lubricating oil from flowing into the housing but also enhance the rigidity of the housing without involving an increase in number of components.

In addition, according to a second aspect of the invention, the eaves-like projecting portions are connected to bearing portions (a second bearing wall 26, a bearing hole 40) provided on the upper housing for supporting the balance shafts, whereby the rigidity of the bearing portions can be enhanced. According to a third aspect of the invention, the eaves-like projecting portions are connected to an axial position regulating portion (a thrust bearing wall 16) for the balance shafts which is provided on the upper housing, whereby the rigidity of the axial position regulating portion can be enhanced. According to a fourth aspect of the invention, the eaves-like projecting portions are connected to fastening portions (boss portions 39) which are provided on the upper housing for fastening the lower housing, whereby the rigidity of the fastening portion can be enhanced.

On top of the above constructions, according to a fifth aspect of the invention, the edge surfaces of the respective side walls of the divided housings which are brought into contact with the dividing plane are offset from each other to thereby form the gaps, whereby the reduction in strength of the side walls otherwise resulting from the provision of lubricating oil discharge ports is substantially eliminated, thus the rigidity of the housing being able to be enhanced as a whole.

DETAILED DESCRIPTION OF THE PREFERRED EMBODIMENTS

Referring to the accompanying drawings, the invention will be described in detail below.

Figure 1:
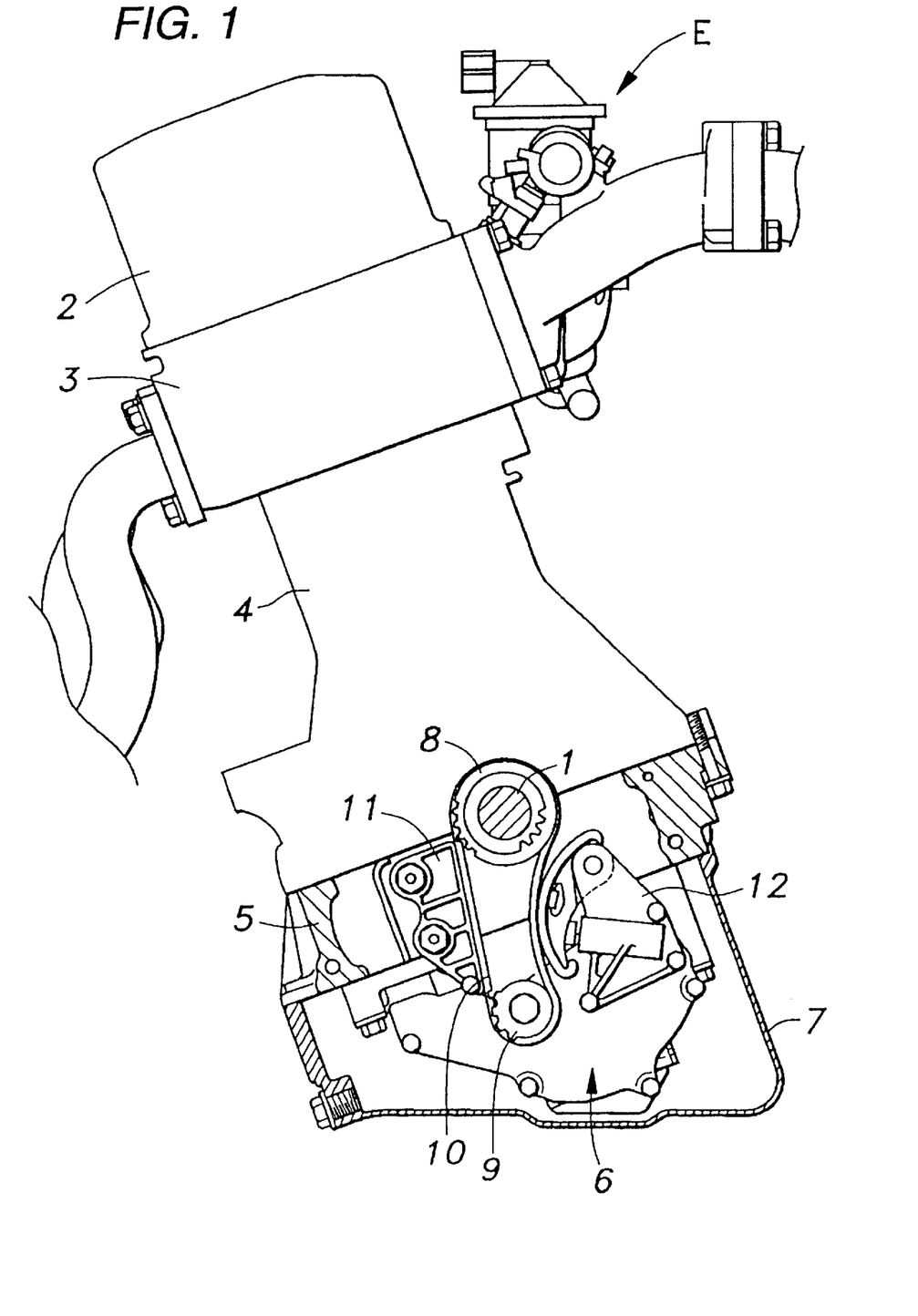
FIG. 1 is a front view of an engine to which the invention is applied to, the engine being partially cut away to show a main part thereof.

FIG. 1 shows a reciprocating piston engine. This engine E is an inline four-cylinder engine in which a crankshaft 1 extends horizontally and comprises a head cover 2, a cylinder head 3, a cylinder block 4, a lower block 5, a balancing device 6 and an oil pan 7.

The balancing device 6 is intended to reduce a secondary vibration of the engine E generated by reciprocating motions of pistons, and the device is bolted to a lower surface of the lower block 5 (below the crankshaft 1) within the oil pan 7.

The balancing device 6 is constructed such that the rotation of the crankshaft 1 is transmitted to this balancing device 6 via a large sprocket 8 fixed to a front end portion of the crankshaft 1 (hereinafter, a crank pulley or chain case side is referred to as the front side), a small sprocket 9 fixed to a front end of a balance shaft (which will be described in detail later) on the left-hand side (hereinafter, lateral directions are determined when viewed as facing the crank pulley or chain case) and a endless link chain 10 extended between the large and small sprockets 8, 9.

Vibration of the endless link chain 10 is prevented by a chain guide 11 fixed to the front side of the lower block 5 leftward of the center of the crankshaft, and an appropriate tension is designed to always be applied to the endless link chain 10 by a chain tensioner 12 fixed to a front end of the balancing device 6 next rightward to the small sprocket 9.

Figure 2:
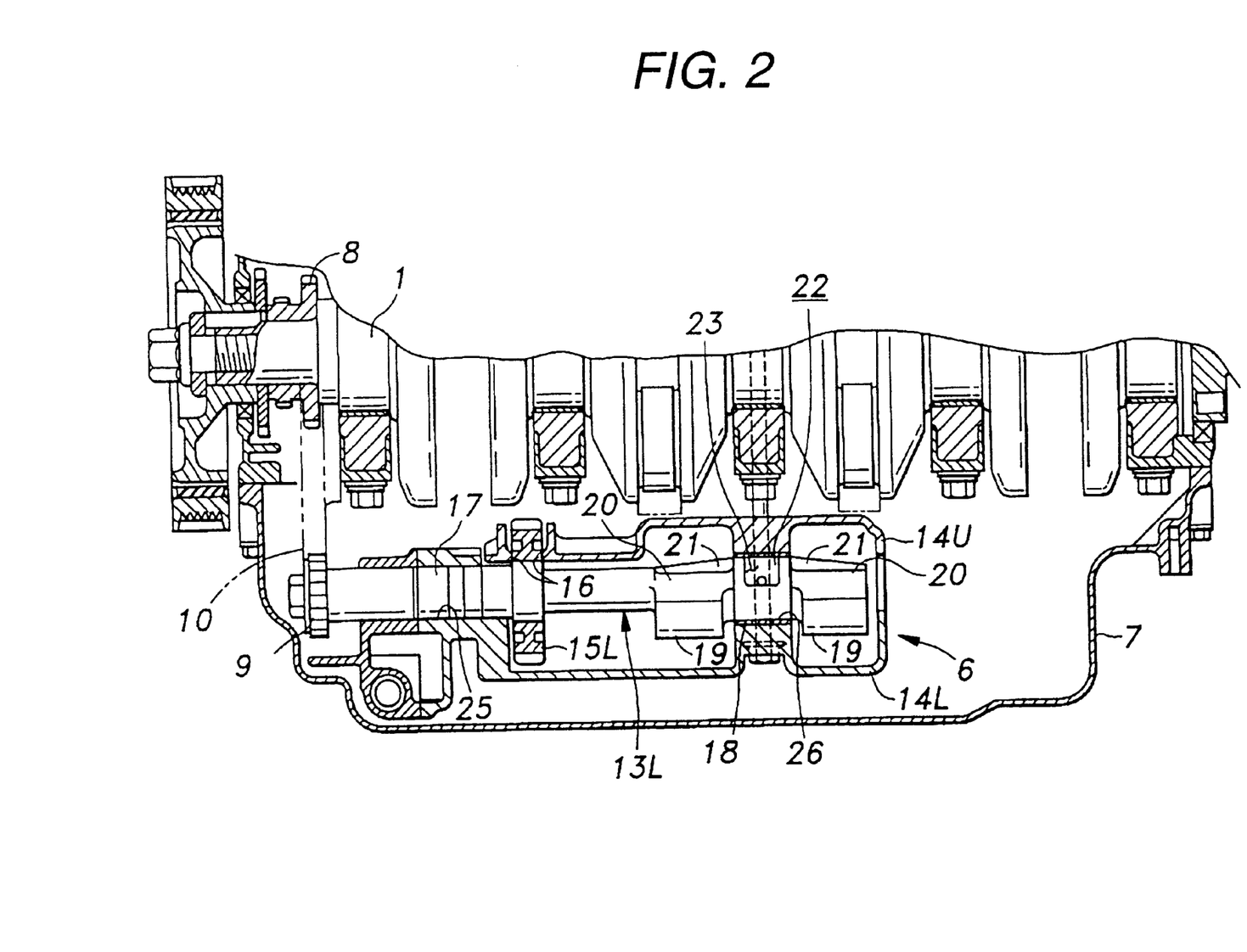
FIG. 2 is a partial longitudinal sectional view taken along an axial center of a left balance shaft to show the interior of an oil pan.
Figure 3:
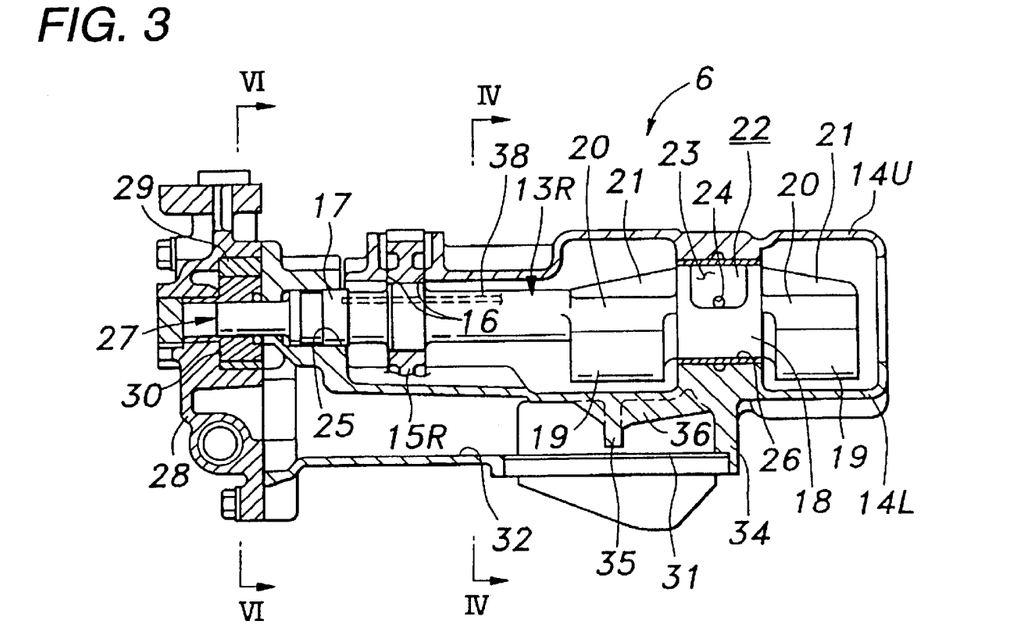
FIG. 3 is a longitudinal sectional view of a balancing device taken along an axial center of a right balance shaft.
Figure 4:
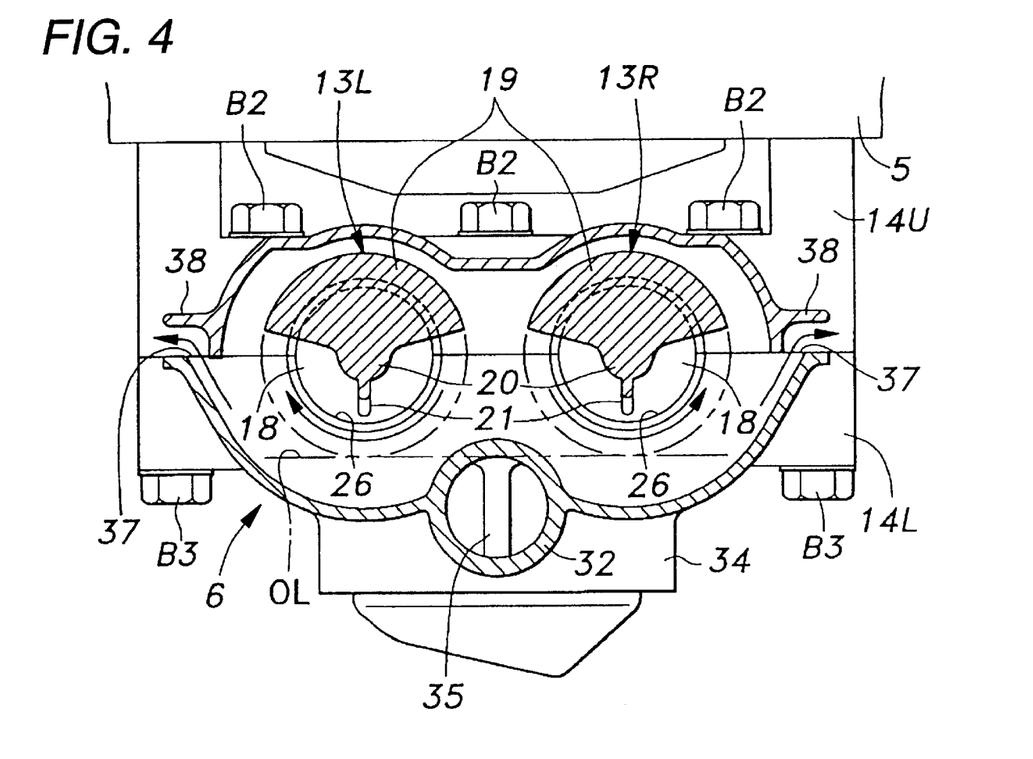
FIG. 4 is a cross-sectional view taken along the line IV—IV of FIG. 3 to snow the main part.

As shown in FIGS. 2 to 4, the balancing device 6 comprises a pair of left and right balance shafts 13L, 13R which are substantially of the same configuration and an upper housing 14U and a lower housing 14L which are divided vertically as two halves by a plane passing through centers of the two balance shafts 13L, 13R so that the balance shafts 13L, 13R can be supported in parallel with each other and thereby accommodated therein.

The two balance shafts 13L, 13R are interlockingly connected to each other with helical gears 15L, 15R which are connected integrally with the balance shafts 13L, 13R, respectively. Here, the driving force of the crankshaft 1 is transmitted to the left balance shaft 13L, as mentioned above, via the large sprocket 8, the endless link chain 10 and the small sprocket 9. The left balance shaft 13L is thereby driven to rotate at twice of crankshaft 1 speed in the same direction as that of the crankshaft 1, and the right balance shaft 13R is driven to rotate in an opposite direction through mesh engagement of the helical gears 15L, 15R.

As shown in FIGS. 2 and 3, a thrust bearing wall 16 is formed on the upper housing 14U at portions corresponding to the helical gears 15L, 15R, the thrust bearing wall 16 having thrust receiving faces adapted to be brought into abutment with axial end faces of the respective helical gears 15L, 15R which are made integral with the respective balance shafts 13L, 13R. These portions are open upwardly, and parts of outer circumferences of the two helical gears 15L, 15R are always exposed into the oil pan so that Lubricating oil dropping from above or flying within the oil pan 7 penetrates into the mesh engagement portion between the two helical gears 15L, 15R and the thrust bearing wall 16, whereby those portions are sufficiently lubricated.

First journal portions 17 each having a relative small diameter and second journal portions 18 each having a relatively large diameter are integrally formed on front ends and rear ends of the respective balance shafts 13L, 13R. Additionally, counterweights 19 are also integrally formed on the rear ends of the respective balance shafts 13L, 13R in such a manner that the counterweights 19 are each divided into two halves before and after the second journal portions 18. The position of the gravity of the counterweight 19 is offset radially outwardly from the rotational center thereof, and the diameter of its rotational locus Is made larger than the diameter of the second journal portion 18 (refer to FIG. 4).

A shaft portion 20 of the counterweight 19 is made thin in order to obtain an originally designed equivalent rotational mass with a counterweight 19 which is made as small as possible. Then, in order to compensate for a reduction in rigidity resulting from the smaller diameter, tapered ribs 21 connecting to axial end faces of the second journal portion 18 are provided on a side opposite to the counterweights 19 of two shaft portions 20 holding the second journal portion 18 longitudinally therebetween.

In addition, in order to make the counterweight 19 further smaller by offsetting the position of the gravity of the second journal portion 18 toward the counterweight 19 side, extra metal is cut away from a side of the second journal portion 18 which is opposite to where the counterweight 19 is formed, in such a manner as to remain only axial ends of the second journal portion 18. Then, a rib 23 extending along a plane on which the central axis of the second journal portion 18 passes is provided so as to extend over a space 22 produced between the axial ends of the second journal portion 18 after the extra metal has been cut away in order to compensate for a reduction in bending rigidity resulting from the cutting away of the extra metal (refer to FIG. 5) Note that the rib 21 provided on the shaft portion 20 of the counterweight 19 and the rib 23 provided on the second journal portion 18 are provided so as to extend along the identical plane.

Through this construction, the shaft end portions of the second journal portion 18 on the opposite side to the counterweight are allowed to come into contact with an inner circumferential surface of a metal bearing, which will be described later, and therefore there is no risk of oil film breakage irrespective of the fact that a contact area of the second journal portion 18 with the bearing hole is made smaller as a whole, and this can contribute to the reduction in rotational resistance.

Figure 5:
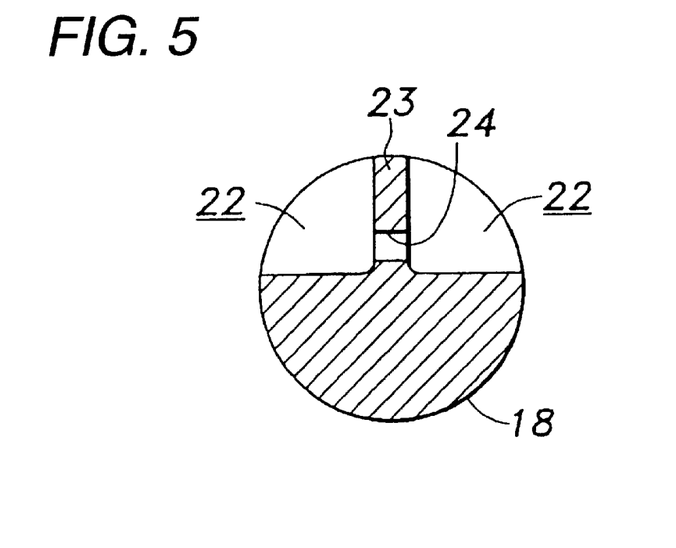
FIG. 5 is a cross-sectional view of a second journal portion of the balance shaft taken along a plane intersecting an axis of the second journal portion.

Note that a through hole 24 establishing a communication between sides of the rib 23 is formed in the rib 23 on an axial center side thereof, so as to facilitate the flow of lubricating oil within the space 22 resulting from the cutting away of the extra metal thereat, whereby the lubricating oil is prevented from remaining within the space so as not to cause an increase in rotational resistance.

On the other hand, the first journal portions 17 of the respective balance shafts 13L, 13R are supported on a first bearing wall 25 provided integrally with a front wall of the lower housing 14L. Then, the second journal portions 18 of the respective balance shafts 13L, 13R are supported on a second bearing wall 26 provided with a two-part metal bearing which is formed by connecting together both the upper and lower housings 14U, 14L.

To accommodate the two balance shafts 13L, 13R in the two housings 14U, 14L, the front ends of the two balance shafts 13L, 13R are inserted into holes formed in the first bearing wall 25 which is made integral with the lower housing 14L, so that the respective first journal portions 17 are allowed to be supported on the first bearing wall 25, and the second journal portions 18 of the respective balance shafts 13L, 13R are allowed to rest on a half-divided portion on the lower housing side 14L of the second bearing wall 20 in which a two-part metal bearing is provided. Then, in th s state, the other half-divided portion on the upper housing 14U side of the second bearing wall 26 being aligned with the second journal portions 18 of the respective balance shafts 13L, 13R, the upper and lower housings 14U, 14L are joined to each other, whereby the two balance shafts 13L, 13R are rotatable accommodated in the two housings 14U, 14L.

Using this construction obviates the necessity of the counterweight 19 to be put through the bearing hole, and therefore the respective journal portions 18, 19 can be thinned while maintaining the sufficient strength thereof, thereby making it possible to reduce the rotational resistance. Moreover, the miniaturization and weight reduction of the housings 14U, 14L which accommodate the balance shafts 13L, 13R can be enhanced at a higher level.

Figure 6:
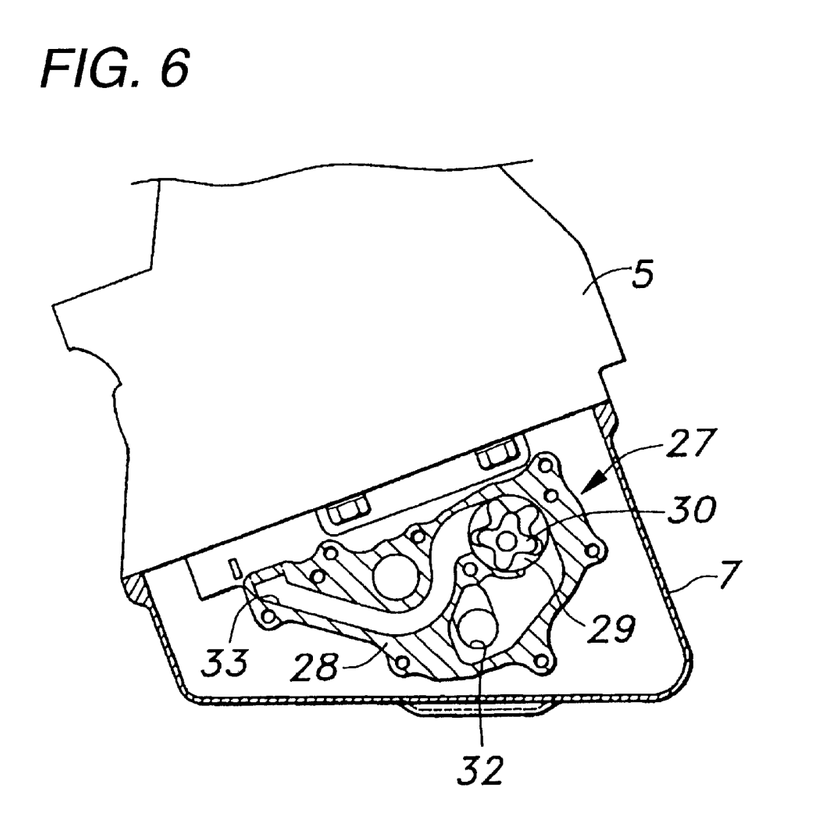
FIG. 6 is a cross-sectional view taken along the line VI—VI of FIG. 3 to show the main part.

As shown also in FIG. 6, a trochoidal lubricating oil pump 27 is provided on the front end faces of the upper and lower housings 14U, 14L for distributing lubricating oil under pressure to respective portions of the engine. This lubricating oil pump 27 comprises an outer rotor 29 received in a pump housing 28 bolted to the front end faces of both the housings 14U, 14L and an inner rotor 30 connected to the front end of the right balance shaft 13R. Then, the inner rotor 30 adapted to rotate together with the right balance shaft 13R is constructed so as to distribute under pressure, in cooperation with the outer rotor 29, lubricating oil in the oil pan 7 which has been taken in from the oil strainer 31 attached Lo a bottom wall of the lower housing 14L via an intake pipe 32 formed integrally with the bottom wall of the lower housing 14L, to respective portions of the engine via a lubricating oil discharge path 33 connected to lubricating oil paths (not shown) formed in the lower block 5 and the cylinder block 4.

As shown in FIG. 3, an attaching boss 34 for the oil strainer 31 is connected to the half-divided portion of the second bearing wall 26 at a longitudinally intermediate portion of the lower housing 14L. The intake pipe 32 formed integrally with the lower surface of the lower housing 14L terminates at the vicinity of the frontward first bearing wall 25. The attaching boss 34 for the oil strainer 31 and the hollow intake pipe 32 are formed integrally in such a manner that they continuously align in line with each other at a position between the two balance shafts 13L, 13R on the lower surface of the lower housing 14L. Thus, since this construction allows in particular the plurality of bearing walls (25, 26) of the lower housing 14L which support the front and rear ends of the balance shafts 13L, 13R to be connected by the attaching portion 34 for the strainer 31 and the intake pipe 32, the construction considerably contributes to enhancing the rigidity of these bearing walls (25, 26).

Note that the intake pipe 32 partially intrudes into an area between the two balance shafts 13L, 13R (refer to FIG. 4) This helps reduce the downward expanding amount of the intake pipe. In addition to this, since the oil strainer 31 is attached directly to the bottom wall of the lower housing 14L, the enlargement of the lower housing 14L is avoided. Thus, the construction contributes to making the engine compact.

A pin-like projection 35 is provided so as to erect from a bottom surface of an intake port at which the oil strainer 31 comprising a metal screen is provided, so that the inward deformation of the oil strainer 31 can be suppressed. This projection 35 and the inner circumferential surface of the strainer attaching boss 34 are connected to each other by a rib 36, which helps enhance further the rigidity of, in particular, the half-divided portion of the bearing wall 26 of the strainer attaching boss 34.

Respective end edges of left and right side walls of the upper housing 14U and the lower housing 14L which come into contact with the dividing plane between the two housings are, as shown in FIG. 4, offset to each other in the diametrical direction of the balance shafts 13L, 13R, whereby gaps 37 open upwardly are formed in a plane passing through the centers of the two balance shafts 13L, 13R. Lubricating oil OL accumulating in the bottom of the lower housing 14L is scooped up by the counterweight 19 as the two balance shafts 13L, 13R rotate (in directions as indicated by arrows) to thereby be discharged to the outside of the housings 14U, 14L from the gaps 37.

Eaves-like projecting portions 38 are provided on the left and right side walls of the upper housing 14U so as to extend longitudinally. These eaves-like projecting portions 38 confront the openings of the gaps 37 so as to prevent lubricating oil dropping from above from entering into the housings 14U, 14L.

Figure 7:
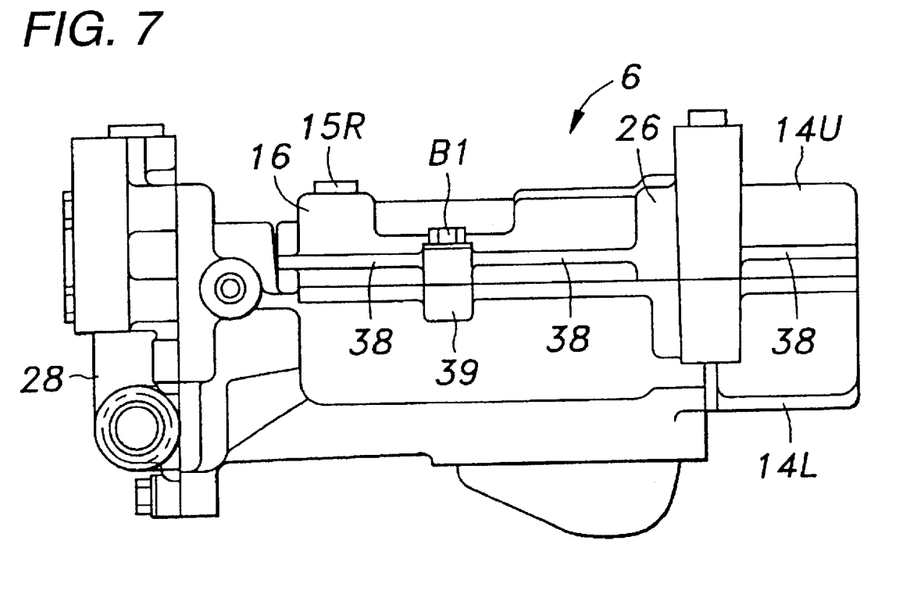
FIG. 7 is a right side view of the balancing device.
Figure 8:
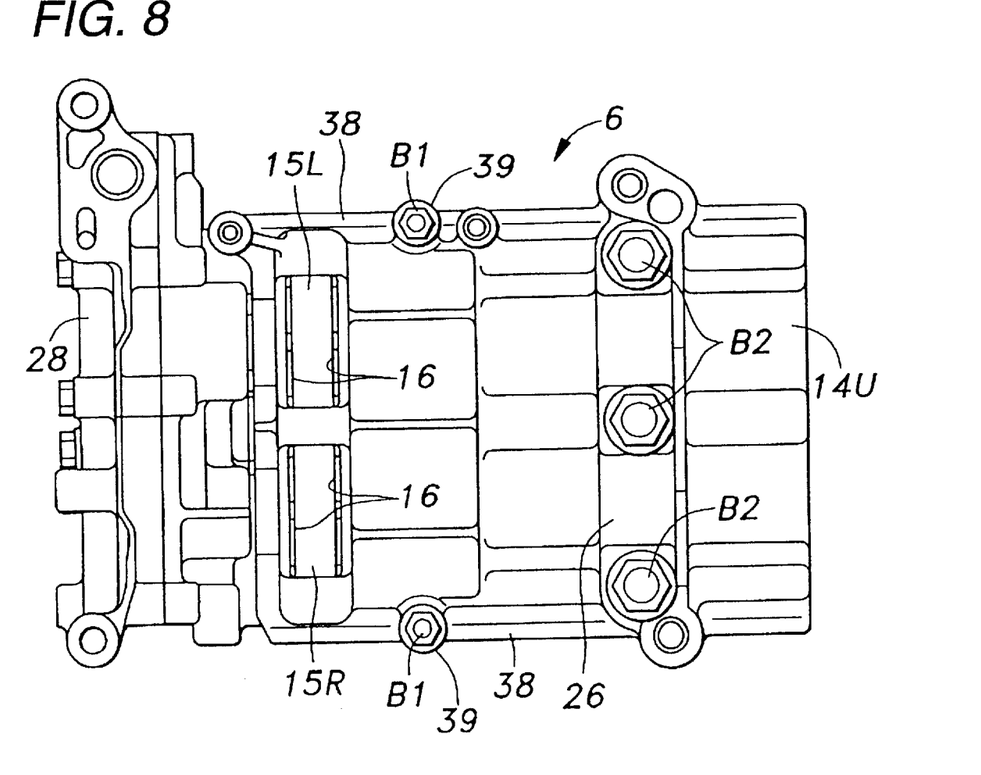
FIG. 8 is a top view of the balancing device.

As shown in FIGS. 7 and 8, these eaves-like projecting portions 38 are formed longitudinally along the full length of the left and right side walls of the upper housing 14U, and connected to the eaves-like projecting portions 38 are boss portions 39 through which bolts B1 are put through to fasten the upper and lower housings 14U, 14L together, the second bearing wall 26, and a thrust bearing wall 16 adapted be brought into abutment with the helical gears 15L, 15R integrally connected to the respective balance shafts 13L, 13R for regulating axial positions thereof, thus the eaves-like projecting portions 38 contributing to enhancing the rigidity of the upper housing 14U.

Note that the upper and lower housings 14U, 14L are fastened together wish three bolts B2 at the second bearing wall 26 where the second journal portions 18 are supported, so that looseness is difficult to be generated at, in particular, the second bearing wall 26 where diametrical acceleration resulting from the rotation of the counterweight 19 is applied.

Figure 9:
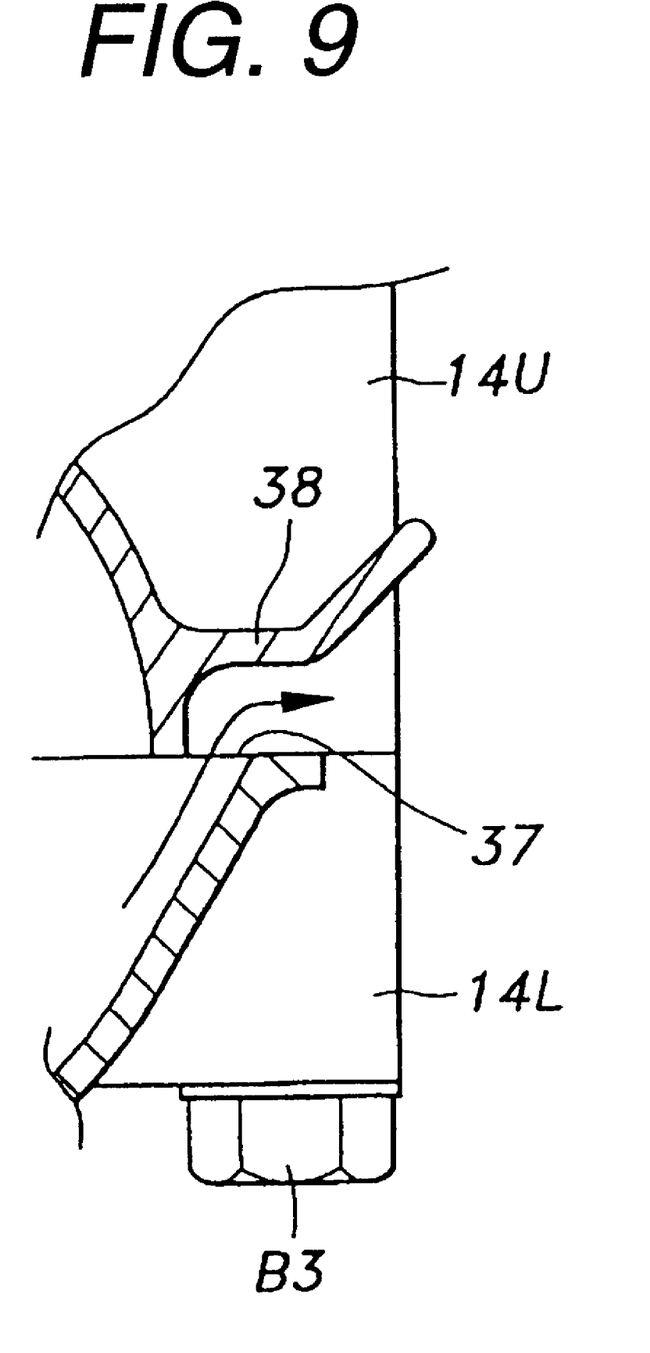
FIG. 9 is a partial vertical sectional view showing another form of an eaves-like projecting portion.

The eaves-like projecting portions 38 can be allowed to function as a baffle plate for preventing the surface of lubricating oil within the oil pan from getting roughened, by allowing the eaves-like projecting portions 38 to extend laterally and to have a suitable cross-sectional configuration as shown in FIG. 9.

Figure 10:
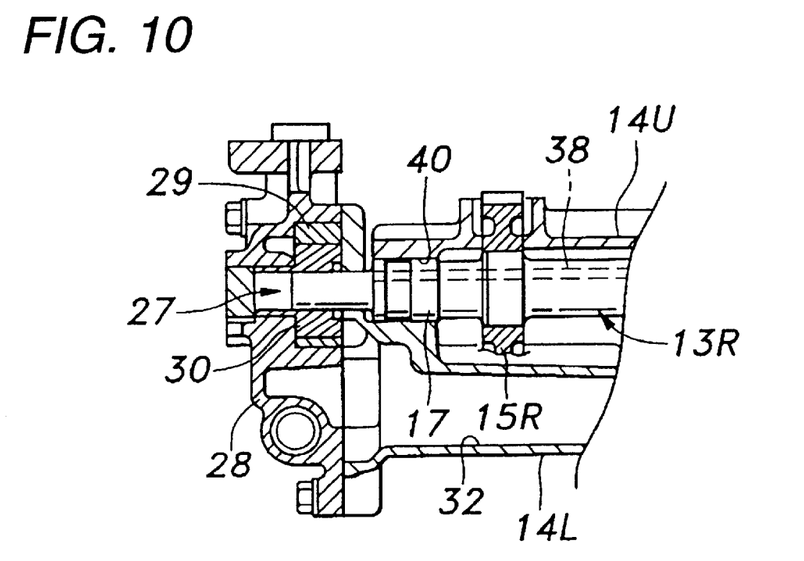
FIG. 10 is a partial longitudinal sectional view showing another form of a first journal portion.
Figure 11:
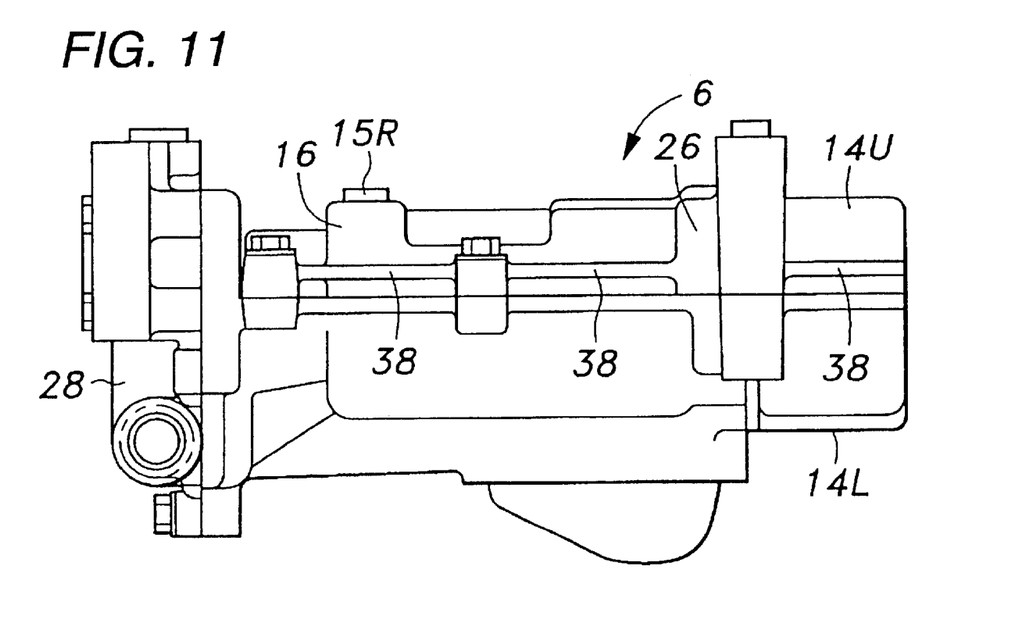
FIG. 11 is a right side view showing another form of a balancing device.
Figure 12:
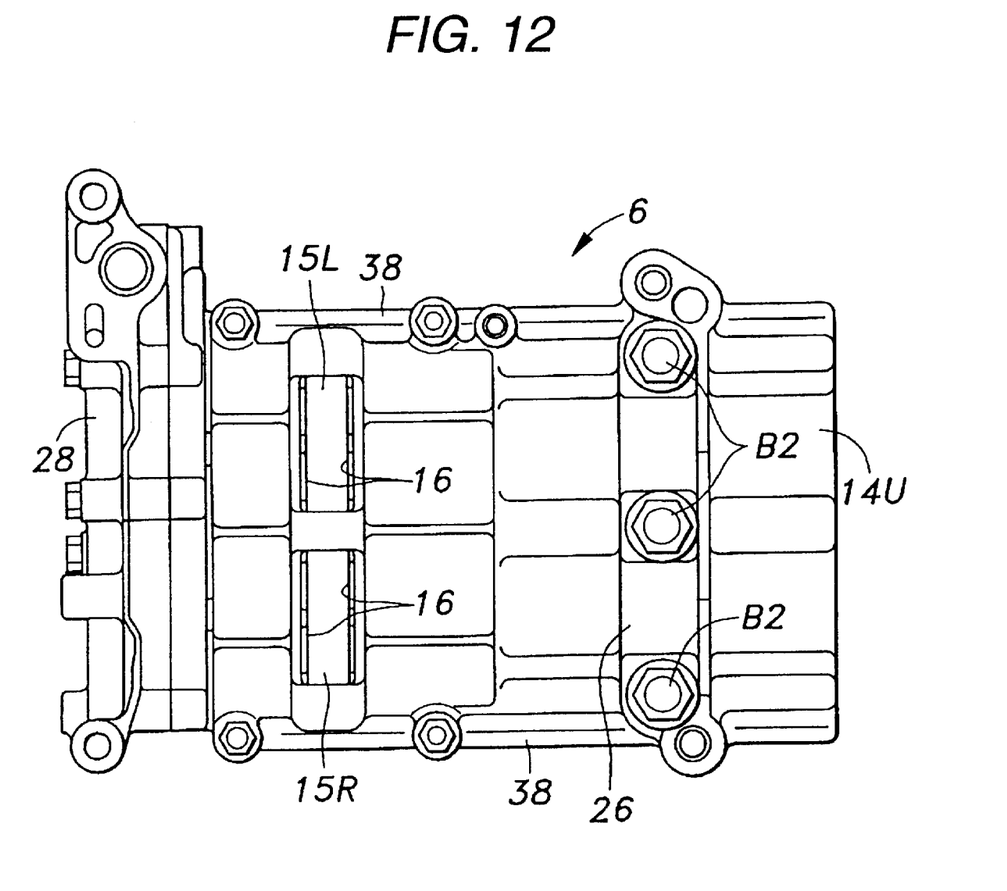
FIG. 12 is a top view showing the balancing device shown in FIG. 11.

As shown in FIG. 10, a bearing hole 40 supporting the first journal portion 17 can be formed at the dividing plane between the upper and lower housings 14U, 14L. According to this form, since the dividing planes of the respective bearings for the first and second journal portions 17, 18 can be used commonly, an accuracy can be improved at which the axial centers of the respective bearings align with each other. Moreover, as shown in FIGS. 11 and 12, the front and rear bearing walls can be connected to each other by the eaves-like projecting portions 38 by allowing the eaves-like projecting portions 38 to extend to the supporting portion of the first journal portion 17, thus making it possible to improve the rigidity of the front and rear bearing walls.

The balancing device 6 constructed as described heretofore is fastened to the lower block 5 from below with bolts B3, as shown in FIG. 4.

As is clear from the description that has been made heretofore, according to the invention, since the balance shaft housing is divided along the plane which is parallel with the balance shafts, the gaps are formed in the dividing plane for discharging lubricating oil, and the eaves-like projecting portions are integrally formed on the upper housing for covering the surfaces confronting the gaps, the eaves-like projecting portions help not only prevent lubricating oil from flowing into the housing but also enhance the rigidity of the housing.

In addition, the eaves-like projecting portions are connected to the bearing portions for supporting the balance shafts, whereby the rigidity of the bearing portions can be enhanced. Furthermore, the eaves-like projecting portions are connected to the axial position regulating portion for the balance shafts which is provided on the upper housing, whereby the rigidity of the axial position regulating portion can be enhanced. Moreover, the eaves-like projecting portions are connected to the fastening portions which are provided on the upper housing for fastening the lower housing, whereby the rigidity of the fastening portion can be enhanced. Additionally, the edge surfaces of the respective side walls of the divided housings which are brought into contact with the dividing plane are offset from each other to thereby form the gaps, whereby the reduction in strength of the side walls otherwise resulting from the provision of lubricating oil discharge ports is substantially eliminated, and the rigidity of the housing can be enhanced as a whole.

While only certain embodiments of the invention have been specifically described herein, it will apparent that numerous modifications may be made thereto without departing from the spirit and scope of the invention.

What is claimed is:

1. A balance shaft housing disposed in an oil pan for accommodating balance shafts provided with counterweights, said housing comprising:

an upper housing and a lower housing divided along a plane which is parallel with said balance shafts and substantially passes through respective centers of said balance shafts, said upper and lower housings having end surfaces which are substantially brought into contact with said plane in respective side walls thereof in such a manner as to cooperatively define a gap therebetween, for discharging lubricating oil from said housing, wherein an eaves-like projecting portion is integrally formed on one side of said upper housing so as to confront said gap.

2. A balance shaft housing according to claim 1, wherein bearing portions for supporting said balance shafts are provided on said upper housing, and wherein said eaves-like projecting portions are connected to said bearing portions.

3. A balance shaft housing according to claim 2, wherein axial position regulating portions for said balance shafts are provided on said upper housing, and wherein said eaves-like projecting portions are connected to said regulating portions.

4. A balance shaft housing according to claim 3, wherein fastening portions for fastening the lower housing are provided on said upper housing, and wherein said eaves-like projecting portions are connected to said fastening portions.

5. A balance shaft housing according to claim 4, wherein said edge surfaces of said respective side walls of said upper and lower housings which are brought into contact with said plane are offset from each other to thereby form said gaps.

6. A balance shaft housing according to claim 1, wherein axial position regulating portions for said balance shafts are provided on said upper housing, and wherein said eaves-like projecting portions are connected said regulating portions.

7. A balance shaft housing according to claim 6, wherein fastening portions for fastening the lower housing are provided on said upper housing, and wherein said eaves-like projecting portions are connected to said fastening portions.

8. A balance shaft housing according to claim 7, wherein said edge surfaces of said respective side walls of said upper and lower housings which are brought into contact with said plane are offset from each other to thereby form said gaps.

9. A balance shaft housing according to claim 1, wherein fastening portions for fastening the lower housing are provided on said upper housing, and wherein said eaves-like projecting portions are connected to said fastening portions.

10. A balance shaft housing according to claim 9, wherein said edge surfaces of said respective side walls of said upper and lower housings which are brought into contact with said plane are offset from each other to thereby form said gaps.

11. A balance shaft housing according to claim 1, wherein said edge surfaces of said respective side walls of said upper and lower housings which are brought into contact with said plane are offset from each other to thereby form said gaps.

12. A balance shaft housing according to claim 11, wherein said eaves-like projecting portions are laterally projected to confront said end surfaces of said side walls of said lower housing.

13. The balance shaft housing according to claim 1, wherein said eaves-like projecting portion is partially formed on said side wall of said upper housing in parallel with said plane.

* * * * *